United States Patent
Wang

(10) Patent No.: US 8,166,346 B2
(45) Date of Patent: Apr. 24, 2012

(54) POWER-ON TEST SYSTEM AND METHOD

(75) Inventor: Ting-Chung Wang, Taipei Hsien (TW)

(73) Assignee: Hon-Hai Precision Industry Co., Ltd., Tu-Cheng, New Taipei (TW)

( * ) Notice: Subject to any disclaimer, the term of this patent is extended or adjusted under 35 U.S.C. 154(b) by 11 days.

(21) Appl. No.: 12/725,418

(22) Filed: Mar. 16, 2010

(65) Prior Publication Data

US 2011/0138233 A1      Jun. 9, 2011

(30) Foreign Application Priority Data

Dec. 4, 2009    (CN) .......................... 2009 1 0310955

(51) Int. Cl.
*G06F 11/00* (2006.01)
(52) U.S. Cl. ........................................ 714/36
(58) Field of Classification Search .................... 714/36
See application file for complete search history.

(56) References Cited

U.S. PATENT DOCUMENTS

| | | | |
|---|---|---|---|
| 7,590,837 B2* | 9/2009 | Bhansali et al. | 713/2 |
| 7,644,263 B2* | 1/2010 | Fujii et al. | 713/1 |
| 2002/0083369 A1* | 6/2002 | Schelling | 714/36 |
| 2002/0162052 A1* | 10/2002 | Lewis | 714/36 |
| 2008/0141073 A1* | 6/2008 | Shih et al. | 714/36 |
| 2008/0172578 A1* | 7/2008 | Tsai | 714/36 |
| 2009/0144585 A1* | 6/2009 | Lu | 714/36 |
| 2010/0306592 A1* | 12/2010 | Wang | 714/36 |

* cited by examiner

*Primary Examiner* — Amine Riad
(74) *Attorney, Agent, or Firm* — Altis Law Group, Inc.

(57) ABSTRACT

A power-on test system is used to test a number of blades of a blade server. The power-on test system supplies power to the number of blades. The power-on test system times for the blades after supplying power, and determines whether the blades are powered on after supplying power. If one of the blades is not powered on, the power-on test system determining whether an accumulated time is less than a set power-on time. If the accumulated time is equal to or greater than a power-on setting time, the power-on test system sends internet protocol address of the blade being not powered on to be displayed.

9 Claims, 4 Drawing Sheets

POWER-ON TEST SYSTEM AND METHOD

BACKGROUND

1. Technical Field

The present disclosure relates to test systems and methods, particularly, to a power-on test system and a method employed in the power-on test system.

2. Description of Related Art

To ensure stability and reliability of electronic devices, such as the blades of a blade sever, each of the blades must pass a series of standard tests. On/off and reset tests are major tests applied to the blade before packing. However, a conventional test device can only tests one blade at a time, which is inconvenient and inefficient.

DETAILED DESCRIPTION

Figure 1:
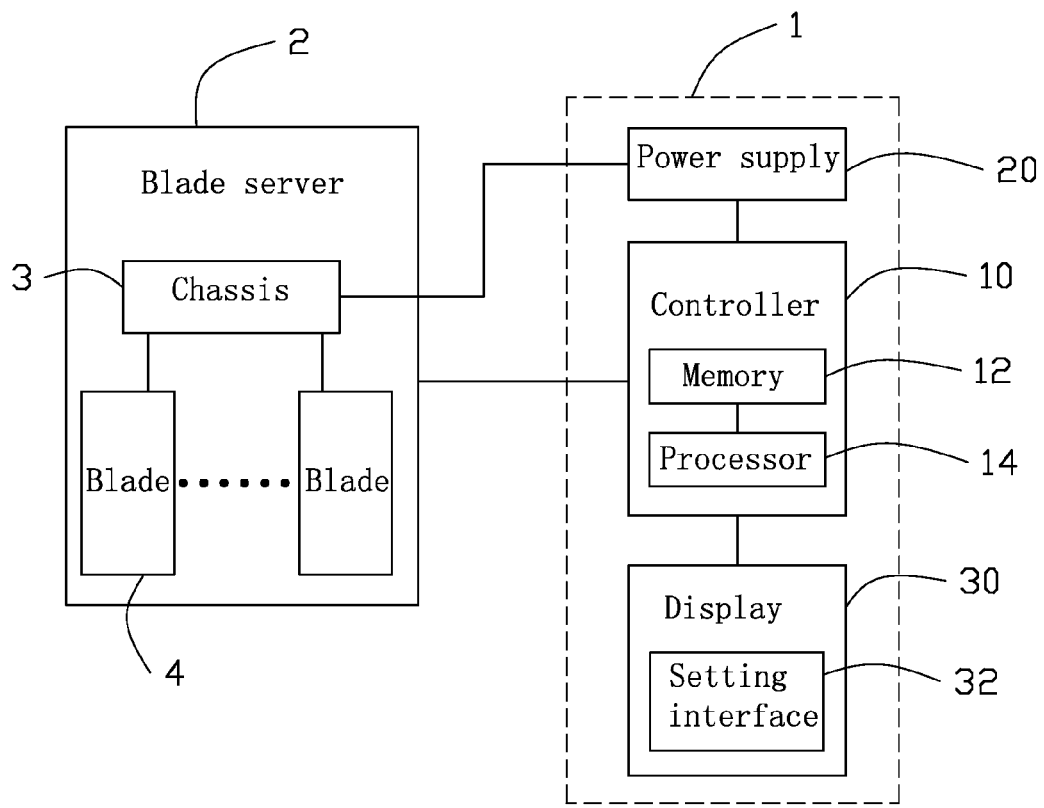
FIG. 1 is a block diagram of one embodiment of a power-on test system connected to a blade server; the power-on test system includes a controller.

Referring to FIG. 1, an exemplary embodiment of a power-on test system 1 includes a controller 10, a power supply 20, and a display 30. The controller 10 is connected between the power supply 20 and the display 30. The power supply 20 is connected to a chassis 3 of a blade server 2, to power the blades 4. The controller 10 communicates with the blades 4. The controller 10 includes a memory 12, and a processor 14. The display 30 includes a setting interface 32 to receive a plurality of set parameters from a user, such as a set power-on time, a set power-off time, a set discharge time, and a set number of tests corresponding to each of the blades 4.

The memory 10 may be a random access memory (RAM) for temporary storage of information or a read only memory (ROM) for permanent storage of information.

In the embodiment, the set power-on time of each blade 4 may be different, which ensures that the blade 4 can normally be powered on. If a blade 4 fails to be powered on within the set power-on time, it cannot conclude that the power-on test thereof has failed. The set number of tests ensures the reliability of the test. The set power-off time ensures the blade 4 has enough time to save data before being powered off. The set discharge time ensures components of the blade 4 discharge completely before the next test.

Figure 2:
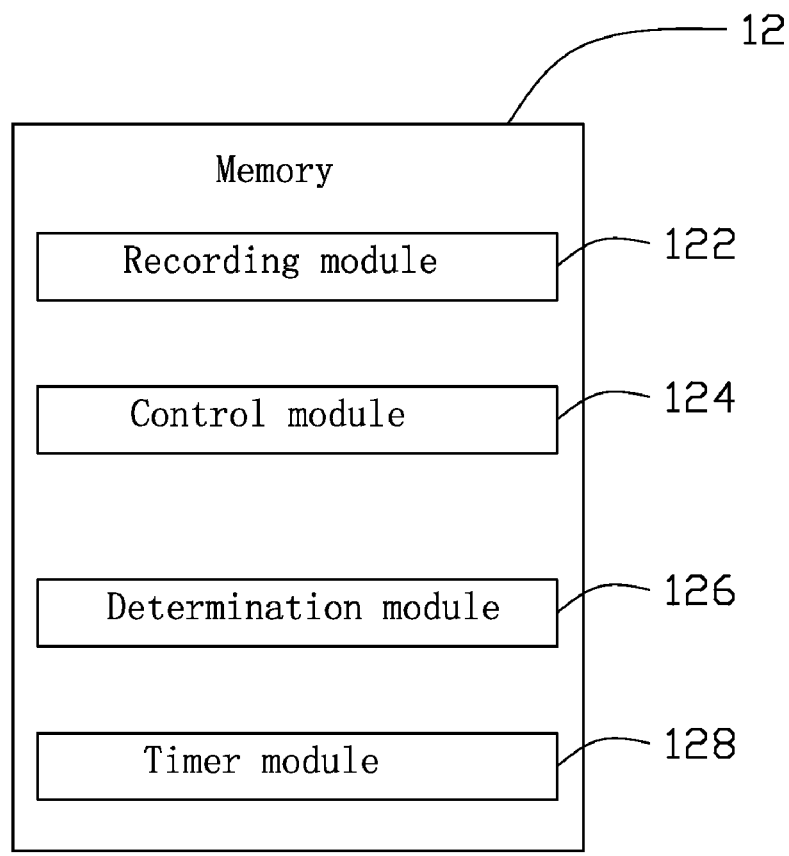
FIG. 2 is a block diagram of one embodiment of a memory of the controller of FIG. 1.

Referring to FIG. 2, the memory 12 includes a recording module 122, a control module 124, a determination module 126, and a timer module 128. The recording module 122, the control module 124, the determination module 126, and the timer module 128 each include one or more computerized instructions capable of being executed by the processor 14. According to an internet protocol (IP) address of each of the blades 4, the recording module 122, the control module 124, the determination module 126, and the timer module 128 process messages or instructions for the blade 4. The timer module 128 may include a plurality of timers or time sections for timing each of the blades 4 according to the IP address thereof. The recording module 122 also counts the number of tests for each of the blades 4 according to the IP address.

The recording module 122 is used to record the set parameters and count the number of tests for each of the blades 4, and transmit a power instruction to the control module 124.

The control module 124 is used to control the power supply 20 to power the blades 4 after receiving the power instruction and start the timer module 128 to time the corresponding blade 4 to power-on. When powered on, the blade 4 outputs a feedback signal to the control module 124. When not powered on, the blade 4 does not output a feedback signal to the control module 124.

The determination module 126 is used to determine whether the blade 4 is powered on based on whether the control module 124 receives the feedback signal from the blade 4. If the control module 124 receives the feedback signal, the determination module 126 determines that the corresponding blade 4 is powered on successfully, and transmits a success instruction to the control module 124 and the recording module 122. If the control module 124 does not receive a feedback signal from one of the blades 4, the determination module 126 determines whether the accumulated time of the timer module corresponding to the blade 128 is less than the set power-on time. If the accumulated time of the timer module 128 is less than the set power-on time, the determination module 126 continues to determine whether the control module 124 receives the feedback signal from the blade 4. If the accumulated time of the timer module 128 is equal to or greater than the set power-on time, the determination module 126 determines the blade 4 is not powered on, and transmits a failure instruction to the control module 124 and the recording module 122.

If the blade 4 is not powered on, the control module 124 receives the failure instruction and then sends the corresponding IP address to the display 30 to be displayed and stops the timer module 128 from timing the corresponding blade 4.

When the recording module 122 receives the failure instruction or the success instruction, and the number of tests corresponding to the blade 4 is added "1" and then is transmitted to the determination module 126. The initial number of tests in the recording module 122 is set to "0".

The determination module 126 is further used to determine whether the number of tests corresponding to the blade 4 reaches the set number of tests. If the number of tests reaches the set number of tests, the testing is completed. If the number of tests does not reach the set number of tests, the control module 124 stops the timer module 128 from timing the corresponding blade 4 after receiving the success instructions. Receiving the success instructions, the control module 124 transmits a power-off instruction to the blade 4 powered on, and the timer module 128 corresponding to the blade 4 is reset to time for power-off. The determination module 126 is used to determine whether the accumulated time is less than the set power-off time. Until the accumulated time is equal to or greater than the set power-off time, the determination module 126 transmits a stop instruction to the control module 124.

The control module 124 is used to stop the power supply 20 powering the blade 4 after receiving the stop instruction, and the timer module 128 corresponding to the blade 4 is reset to time for discharge. The determination module 126 is used to determine whether the accumulated time is less than the set discharge time.

Figure 3:
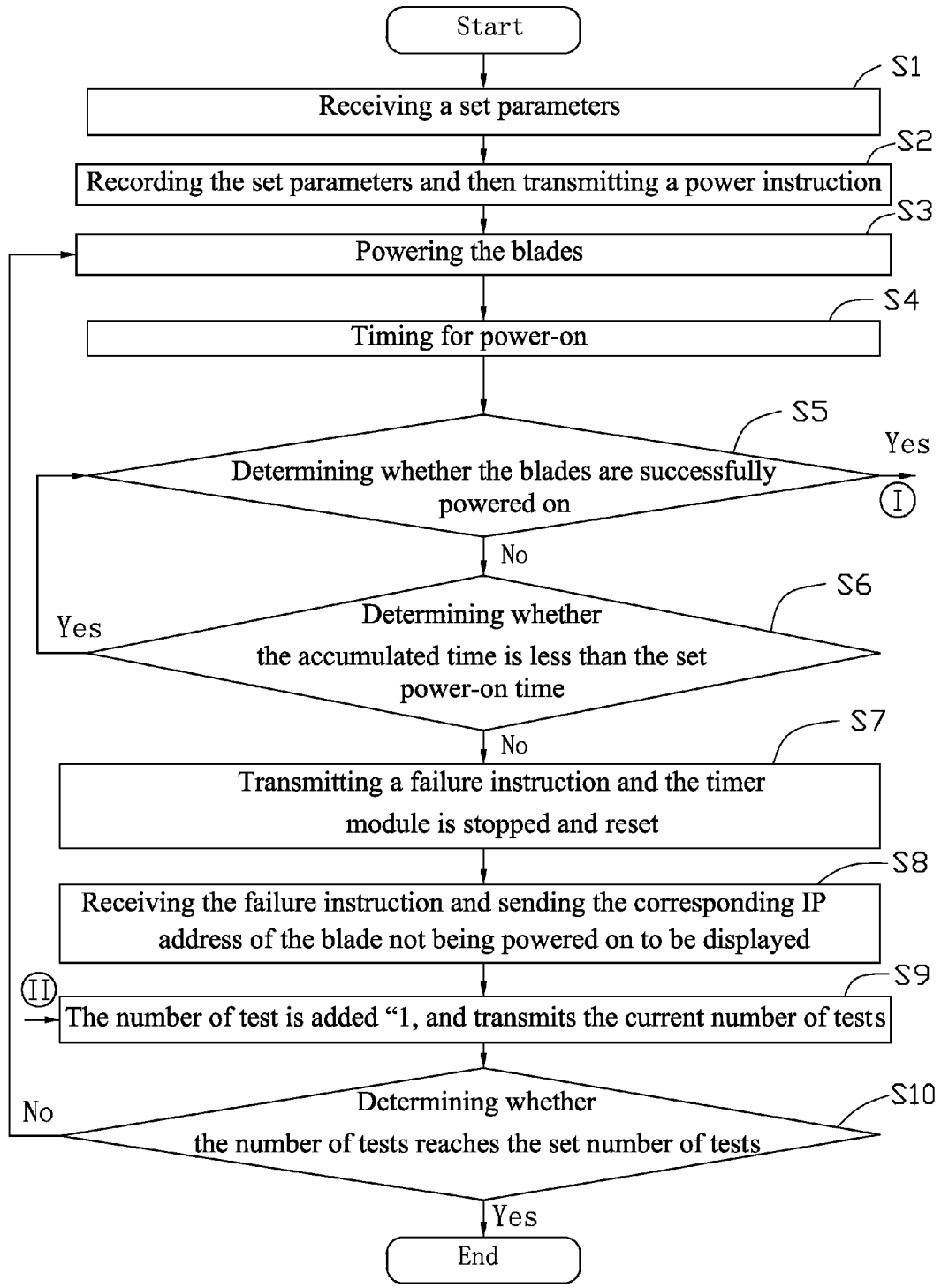
FIGS. 3-4 are flowcharts illustrating one embodiment of a power-on test method.
Figure 4:
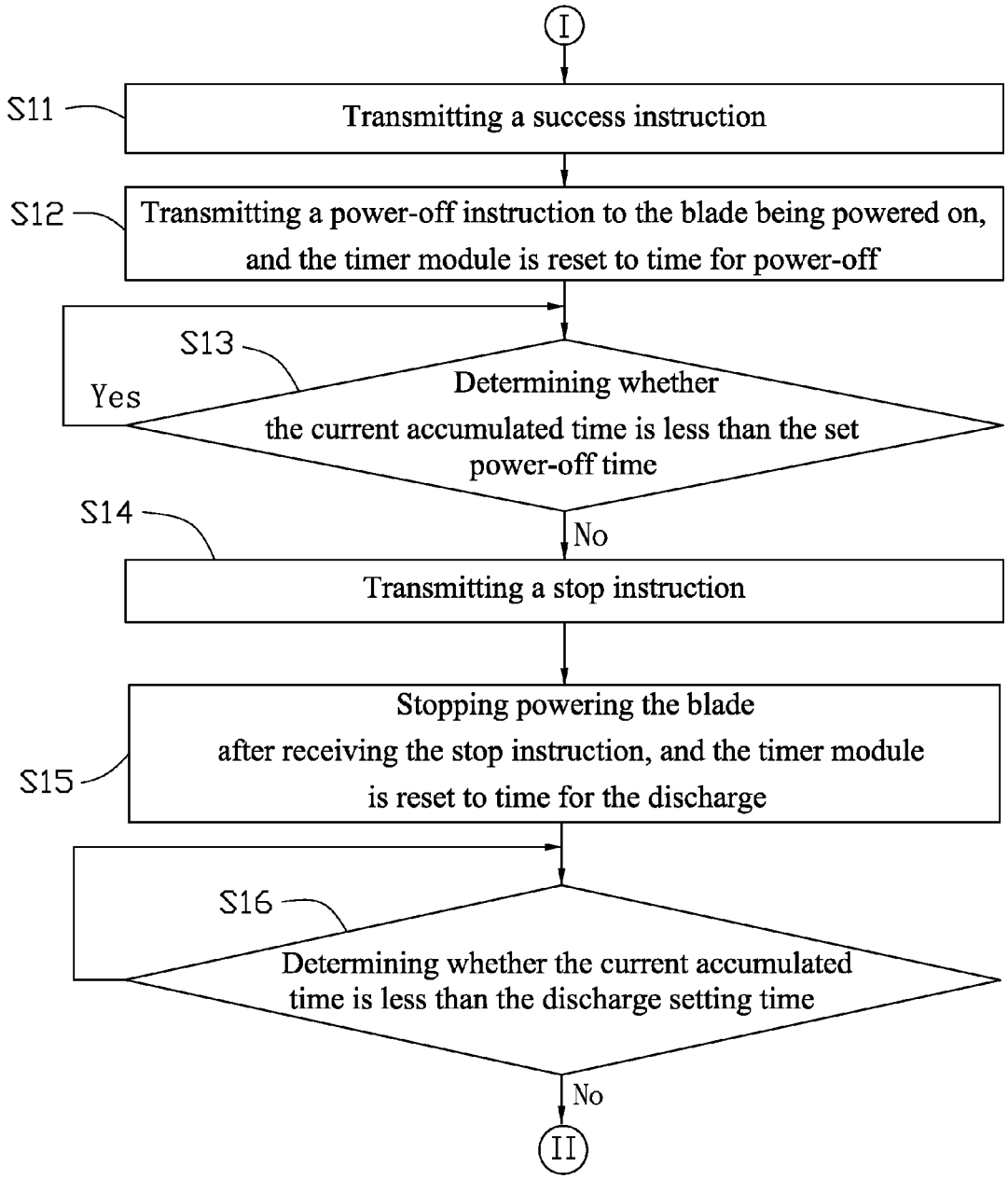

Referring to FIGS. 3 and 4, an exemplary embodiment of a power-on test method for testing the blades 4 of the blade server 2 includes the following steps.

In step S1, the setting interface 32 receives the set parameters from the user. The set parameters include the set power-on time, the set power-off time, the set discharge time, and the set number of tests, corresponding to each of the blades 4.

In step S2, the recording module 122 records the set parameters and then transmits a power instruction to the control module 124.

In step S3, the control module 124 controls the power supply 20 to power the blade 4 after receiving the power instruction.

In step S4, the control module 124 starts the timer module 128 corresponding to the blade 4 to time for power-on.

In step S5, the determination module 126 determines whether the blade 4 is successfully powered on based on whether the control module 124 receives the feedback signal from the blade 4. If the control module 124 receives the feedback signal from the blade 4, the determination module 126 determines that the blade 4 is powered on successfully, and the procedure goes to the step S11. If the control module 124 does not receive the feedback signal from one of the blades 4, the procedure goes to step S6.

In step S6, the determination module 126 determines whether the accumulated time of the timer module 128 corresponding to the blade 4 is less than the set power-on time. If the accumulated time of the timer module 128 is less than the set power-on time, the procedure goes to step S5. If the accumulated time of the timer module 128 is equal to or greater than the set power-on time, the procedure goes to step S7.

In step S7, the determination module 126 transmits the failure instruction to the control module 124 and the recording module 122, and determines that the blade 4 is not powered on, and the timer module 128 corresponding to the blade 4 is stopped and reset.

In step S8, the control module 124 receives the failure instruction and sends the corresponding IP address of the blade 4 not powered on to the display 30 to be displayed.

In step S9, the number of tests of the corresponding blade 4 is added to "1. The recording module 122 transmits the current number of tests to the determination module 126.

In step S10, the determination module 126 determines whether the current number of tests has reached the set number of tests. If the number of tests reaches the set number of tests, the power-on test is completed. If the number of tests does not reach the set number of tests, the procedure goes to step S3.

In step S11, the determination module 126 transmits success instructions to the recording module 122 and the control module 124.

In step S12, the control module 124 transmits a power-off instruction to the blade 4 being powered on, and the timer module 128 corresponding to the blade 4 is reset to time for power-off.

In step S13, the determination module 126 determines whether the current accumulated time is less than the set power-off time. Until the current accumulated time is equal to or greater than the set power-off time, the procedure goes to step S14.

In step S14, the determination module 126 transmits a stop instruction to the control module 124.

In step S15, the control module 124 controls the power supply 20 to stop powering the blade 4 after receiving the stop instruction, and the timer module 128 corresponding to the blade 4 is reset to time for discharge.

In step S16, the determination module 126 determines whether the current accumulated time is less than the set discharge time. Until the current accumulated time is equal to or greater than the set discharge time, the procedure goes to step S9.

In other embodiments, the set number of tests, the set power-off time, and the set discharge time can be changed according to the test request.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A power-on test system for a blade server comprising a plurality of blades, the power-on test system comprising:
   a power supply to power the blades of the blade server;
   a display comprising a setting interface to receive a plurality of set parameters for testing the blades; and
   a controller connected to the power supply and the display, and communicating with each of the blades via a network according to internet protocol (IP) addresses of the blades, the controller comprising:
      a processor; and
      a memory connected to the processor and comprising:
         a recording module to record the set parameters, and transmit power instructions after recording the set parameters;
         a timer module to time for each of the blades;
         a control module to power the blades after receiving the power instructions, and start the timer module; and
         a determination module to determine whether each of the blades is powered on and the test to each of the blades is completed
   wherein the set parameters comprise a set power-on time, a set power-off time, a set discharge time, and a set number of test, corresponding to each of the blades, the determination module determines whether each of the blades is successfully powered on based on whether the control module receives a feedback signal from the blade, if the control module receives the feedback signal from the blade, the determination module determines that the blade is powered on and transmits a success instruction to the recording module and the control module, if the control module does not receive the feedback signal from the blade, the determination module determines whether an accumulated time of the timer module corresponding to the blade is less than the set power-on time, if the accumulated time of the timer module is equal to or greater than the set power-on time, the determination module transmits a failure instruction to the recording module and the control module, the control module controls the display to display the IP address of the blade not being powered on.

2. The power-on test system of claim 1, wherein the number of tests corresponding to the blade is increased when the recording module receives a success instruction or a failure instruction, the determination module determines whether the current number of tests reaches the set number of test, if the current number of tests reaches the set number of test, the testing is completed, if the current number of tests does not reaches the set number of test, the testing for the blade continues.

3. A power-on test method for a blade server comprising a plurality of blades, the power-on test method comprising:
   receiving a plurality of set parameters corresponding to the blades;

recording the set parameters, and transmitting power instructions;

powering the blades after receiving the power instructions;

timing for each of the blades; and determining whether each of the blades is successfully powered on, wherein the set parameter comprises a set power-on time, a set power-off time, a set discharge time, and a set number of test, corresponding to each of the blades, the step "determining whether each of the blades is successfully powered on" is based on whether receiving a feedback signal from the blade; the power-on test method further comprises:

determining whether an accumulated time corresponding to the blade is less than the set power-on time if not receive the feedback signal from the blade;

transmitting a failure instruction if the accumulated time is equal to or greater than the set power-on time; and controlling to display the IP address of the blade not being powered on.

4. The power-on test method of claim 3, further comprising:

increasing the number of tests corresponding to the blade;

determining whether the current number of tests reach the set number of tests; and the testing for the blade continues if the current number of test does not reach the set number of test, the testing is completed if the current number of test reaches the set number of tests.

5. The power-on test method of claim 4, further comprising:

transmitting a success instruction if receiving the feedback signal from the blade.

6. The power-on test method of claim 5, further comprising:

transmitting a power-off instruction after receiving the success instruction, and timing for power-off;

determining whether an accumulated time is less than the set power-off time, repeating the step "determining whether an accumulated time is less than the set power-off time" if the accumulated time is less than the set power-off time; and transmitting a stop instruction to stop powering the corresponding blade if the accumulated time is equal to or greater than the set power-off time.

7. The power-on test method of claim 6, further comprises:

resetting to time for discharge after stopping powering the corresponding blade;

determining whether an accumulated time is less than the set discharge time, repeating the step "determining whether an accumulated time is less than the set discharge time" if the accumulated time is less than the set discharge time; and repeating the step "increasing the number of tests corresponding to the blade" if the accumulated time is equal to or greater than the set discharge time.

8. A power-on test system for a blade server comprising a plurality of blades, the power-on test system comprising:

a power supply to power the blades of the blade server;

a display comprising a setting interface to receive a plurality of set parameters for testing the blades; and a controller connected to the power supply and the display, and communicating with each of the blades via a network according to internet protocol (IP) addresses of the blades, the controller comprising:

a processor; and a memory connected to the processor and comprising:

a recording module to record the set parameters, and transmit power instructions after recording the set parameters;

a timer module to time for each of the blades;

a control module to power the blades after receiving the power instructions, and start the timer module; and a determination module to determine whether each of the blades is powered on and the test to each of the blades is completed wherein the set parameters comprise a set power-on time, a set power-off time, a set discharge time, and a set number of test, corresponding to each of the blades, the determination module determines whether each of the blades is successfully powered on based on whether the control module receives a feedback signal from the blade, if the control module receives the feedback signal from the blade, the determination module determines that the blade is powered on and transmits a success instruction to the recording module and the control module, if the control module receives the success instruction, the control module transmits a power-off instruction to the corresponding blade being powered on, and resets the timer module to time for power-off, the determination module determines whether an accumulated time of the timer module is less than the set power-off time, if the accumulated time of the timer module is less than the set power-off time, the determination module continues determining whether the accumulated time of the timer module is less than the set power-off time, if the accumulated time of the timer module is equal to or greater than the set power-off time, the determination module transmits a stop instruction to the control module to stop powering the corresponding blade.

9. The power-on test system of claim 8, wherein after stopping powering the corresponding blade, the time module is reset to time for discharge, the determination module determines whether an accumulated time of the timer module is less than the set discharge time, if the accumulated time of the timer module is less than the set discharge time, the determination module continue determining whether the accumulated time of the timer module is less than the set discharge time, if the accumulated time of the timer module is equal to or greater than the set discharge time, the test continues.

* * * * *